United States Patent
Zhang et al.

(10) Patent No.: US 10,712,489 B2
(45) Date of Patent: Jul. 14, 2020

(54) LIGHT-EMITTING MODULE AND DISPLAY APPARATUS

(71) Applicants: BOE Technology Group Co., Ltd., Beijing (CN); Hefei BOE Optoelectronics Technology Co., Ltd., Hefei, Anhui (CN)

(72) Inventors: Bing Zhang, Beijing (CN); Lu Gao, Beijing (CN); Liang Gao, Beijing (CN); Jianwei Qin, Beijing (CN); Xiaolin Geng, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 16/542,415

(22) Filed: Aug. 16, 2019

(65) Prior Publication Data
US 2020/0057188 A1 Feb. 20, 2020

(30) Foreign Application Priority Data
Aug. 17, 2018 (CN) .......................... 2018 1 0941892

(51) Int. Cl.
*F21V 8/00* (2006.01)

(52) U.S. Cl.
CPC .......... *G02B 6/0036* (2013.01); *G02B 6/002* (2013.01); *G02B 6/003* (2013.01); *G02B 6/0025* (2013.01); *G02B 6/0031* (2013.01)

(58) Field of Classification Search
CPC .... G02B 6/0036; G02B 6/002; G02B 6/0031; G02B 6/0025; G02B 6/003
See application file for complete search history.

(56) References Cited

U.S. PATENT DOCUMENTS

2007/0076434 A1  4/2007  Uehara et al.
2017/0045670 A1  2/2017  Li et al.

FOREIGN PATENT DOCUMENTS

| CN | 104656183 A | 5/2015 |
| CN | 105093397 A | 11/2015 |
| CN | 204945419 U | 1/2016 |
| CN | 105911760 A | 8/2016 |
| CN | 107479219 A | 12/2017 |

OTHER PUBLICATIONS

First office action of Chinese application No. 201810941892.3 dated Nov. 4, 2019.

*Primary Examiner* — Joseph L Williams

(74) *Attorney, Agent, or Firm* — Fay Sharpe LLP

(57) ABSTRACT

Provided are a light emitting module and a display apparatus. The light emitting module includes: a light emitting unit and a light guide plate; the light guide plate includes a first plate surface and a second plate surface opposite to each other, and a plurality of side surfaces; the light emitting unit is configured to emit light to the light guide plate from the target side surface; the first plate surface includes a plurality of target convex ridges disposed in sequence along a direction away from the light emitting unit; each target convex ridge is configured to totally reflect light emitted from the target side surface into the light guide plate to the second plate surface, angles between the target ridge surfaces of the plurality of target convex ridges and a thickness direction of the light guide plate tends to decrease.

19 Claims, 12 Drawing Sheets

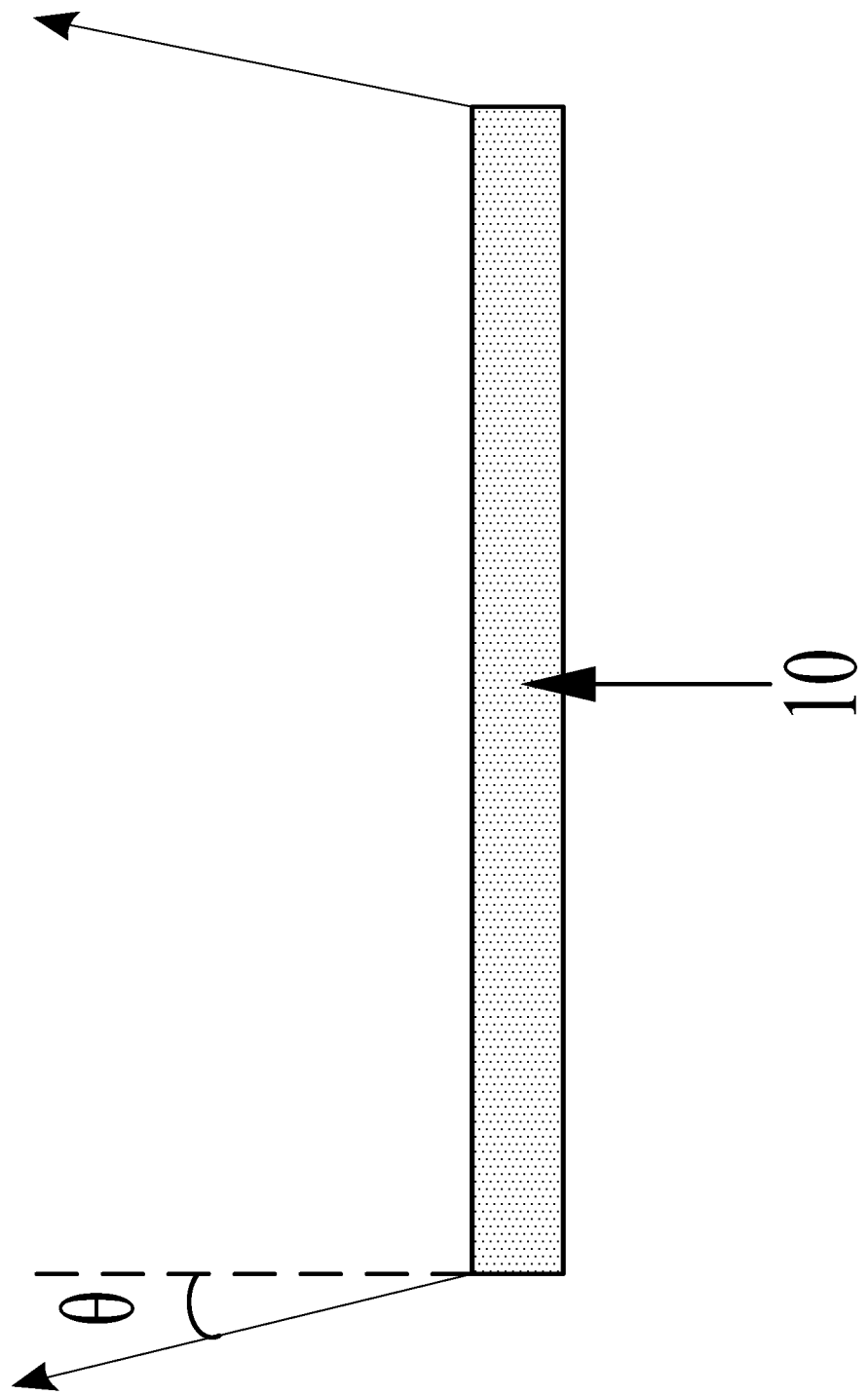

LIGHT-EMITTING MODULE AND DISPLAY APPARATUS

This application claims priority to Chinese Patent Application No. 201810941892.3, filed on Aug. 17, 2018 and entitled "LIGHT EMITTING MODULE AND DISPLAY APPARATUS", the entire contents of which are incorporated herein by reference.

TECHNICAL FIELD

The present disclosure relates to the field of display technology, and particularly to a light emitting module and a display apparatus.

BACKGROUND

With the development of display technologies, display apparatuses, such mobile phones, computers and the like are more and more widely applied. Currently, the display apparatuses have a large visual angle. When a user uses the display apparatus, information displayed on the display apparatus is visible by others, so the rick of user information leakage is high.

In the related art, the risk of user information leakage is reduced by reducing the visual angle of the display apparatus. Exemplarily, a layer of privacy film may be disposed in the display apparatus. The privacy film is used to absorb a portion of light emitted from the light emitting module of the display apparatus, and thus the visual angle of the display apparatus reduces.

SUMMARY

The present disclosure provides a light emitting module and a display apparatus. The technical solutions are as follows.

In an aspect, there is provided a light emitting module, comprising: a light emitting unit and a light guide plate; wherein the light guide plate comprises a first plate surface and a second plate surface opposite to each other, and a plurality of side surfaces connecting the first plate surface and the second plate surface; and the light emitting unit is close to a target side surface of the plurality of side surfaces, and is configured to emit light from the target side surface to the light guide plate; the first plate surface has a plurality of target convex ridges disposed in sequence along a direction away from the light emitting unit, and a length direction of the target convex ridge is parallel to the target side surface; each of the target convex ridges is configured to totally reflect light emitted from the target side surface to the light guide plate to the second plate surface from a target ridge surface, away from the light emitting unit, of each target convex ridge; wherein, in the direction away from the light emitting unit, angles between target ridge surfaces of the plurality of target convex ridges and a thickness direction of the light guide plate tend to decrease.

Optionally, the light guide plate comprises: a first portion and a remaining portion disposed in sequence along the direction away from the light emitting unit; the first portion and the remaining portion comprise the target convex ridges, an angle between a target ridge surface of each target convex ridge in the first portion and the thickness direction is a first angle, and an angle between a target ridge surface of each target convex ridge in the remaining portion is a second angle, and the first angle is greater than the second angle.

Optionally, a minimum angle of the angles between the target ridge surfaces of the plurality of target convex ridges and the thickness direction is 46.5 degrees.

Optionally, the target convex ridge has two ridge surfaces, and the two ridge surfaces of the target convex ridge are both flat surfaces.

Optionally, an angle between a ridge surface, close to the light emitting unit, of the two ridge surfaces of the target convex ridge and the thickness direction is in a range of 0~75 degrees.

Optionally, the target side surface is inclined towards a side where the second plate surface is.

Optionally, the target side surface is a flat surface, and an angle between the target side surface and the thickness direction is in a range of 3.19~5.19 degrees.

Optionally, the second plate surface has at least one first convex ridge, and the first convex ridge is in a region of the second plate surface away from the light emitting unit; a length direction of the first convex ridge is parallel to the target side surface, the first convex ridge has two first ridge surfaces which are both flat surfaces, and a first ridge surface, close to the light emitting unit, of the two first ridge surfaces is parallel to the thickness direction.

Optionally, an angle between a first ridge surface, away from the light emitting unit, of the two first ridge surfaces and the thickness direction is 75 degrees.

Optionally, the light guide plate comprises: a first portion, a second portion and a third portion disposed in sequence along the direction away from the light emitting unit; wherein the third portion has the at least one first convex ridge; the first portion, the second portion and the third portion all comprise the target convex ridges, an angle between a target ridge surface of each target convex ridge in the first portion and the thickness direction is a first angle, an angle between a target ridge surface of each target convex ridge in the second portion and the third portion and the thickness direction is a second angle, and the first angle is greater than the second angle.

Optionally, the first portion and the third portion have an equal length along the direction away from the light emitting unit.

Optionally, the light emitting module further comprises: a lens assembly between the light emitting unit and the light guide plate; wherein the light emitting unit is configured to emit light to the lens assembly, and the lens assembly is configured to adjust light emitted from the light emitting unit to parallel light perpendicular to the thickness direction and emit the parallel light to the light guide plate.

Optionally, the lens assembly comprises: a lens film and a first prism film disposed in sequence along the direction away from the light emitting unit; wherein the lens film is configured to converge the light emitted from the light emitting unit, and emit converged light to the first prism film; and the first prism film is configured to adjust light emitted from the lens film to the parallel light, and emit the parallel light to the light guide plate.

Optionally, the lens film comprises: a lens film body, and a reflection layer attached on a side of the lens film body close to the light emitting unit, a protrusion structure is on a light emitting surface on a side, away from the light emitting unit, of the lens film body, wherein the protrusion structure comprises: a first convex lens protruding from the light emitting surface, and a second convex lens protruding from a central position of a surface of the first convex lens, the reflection layer comprises a hollow region corresponding to the second convex lens, and an orthographic projection of the hollow region on the lens film body is within a region where the second convex lens is; and the first prism film comprises: a prism unit corresponding to the protrusion structure, wherein the lens unit comprises two forward truncated cones disposed in sequence along the direction away from the light emitting unit, the two forward truncated cones have an equal area of upper base surfaces and share a lower base surface, and heights of the two forward truncated cones decrease progressively along the direction away from the light emitting unit; in the protrusion structure and the prism unit corresponding to the protrusion structure, an orthographic projection of any of the two forward truncated cones on the lens film body is within the region where the second convex lens is.

Optionally, the light emitting module further comprises: a second prism film on a side where the second plate surface of the light guide plate is; wherein a plurality of second convex ridges are on a surface, facing towards the light guide plate, of the second prism film, a length direction of the second convex ridge is perpendicular to the length direction of the target convex ridge, the second convex ridge has two second ridge surfaces, and a second ridge surface, close to a center of the second prism film, of the two second ridge surfaces is a flat surface and is parallel to the thickness direction.

Optionally, in the plurality of second convex ridges, two second convex ridges closest to the center of the second prism film are in contact with each other.

Optionally, a second ridge surface, away from the center of the second prism film, of the two second ridge surfaces is a flat surface; and in a plurality of second convex ridges in the center and on the same side of the second prism film, second ridge surfaces away from the center of the second prism film are parallel to each other.

Optionally, the second prism film is symmetric relative to a reference plane, the reference plane is parallel to the thickness direction and a length direction of the second convex ridge and passes through the center of the second prism film.

In another aspect, there is provided a display apparatus, comprising: the light emitting module as described in the above aspect.

BRIEF DESCRIPTION OF THE DRAWINGS

FIG. 12 is a schematic diagram of a cut-off luminance angle of a light emitting module according to an embodiment of the present disclosure.

DETAILED DESCRIPTION

The embodiments of the present disclosure will be described in detail below with reference to the accompanying drawings to present the objects, technical solutions and advantages more clearly.

As display apparatuses are applied more and more widely, in order to reduce the risk of user information leakage, the peep prevention display technology is proposed, that is, a technology for reducing the visual angle of the display apparatus. Generally, a privacy film is employed to absorb a portion of light emitted by the display apparatus, to reduce the visual angle of the display apparatus. However, in this way, the light-emitting luminance of the display apparatus may be lowered. The light emitting module according to embodiments of the present disclosure may directly emit relatively converged light. The light emitting module may be used as a backlight module of the display apparatus, such that the display apparatus where the light emitting module is can implement peep prevention display without arranging the privacy film. Thus, consumption of light emitted from the light emitting module can be avoided by the privacy film, and thus the light-emitting luminance of the display apparatus improves.

Figure 1:
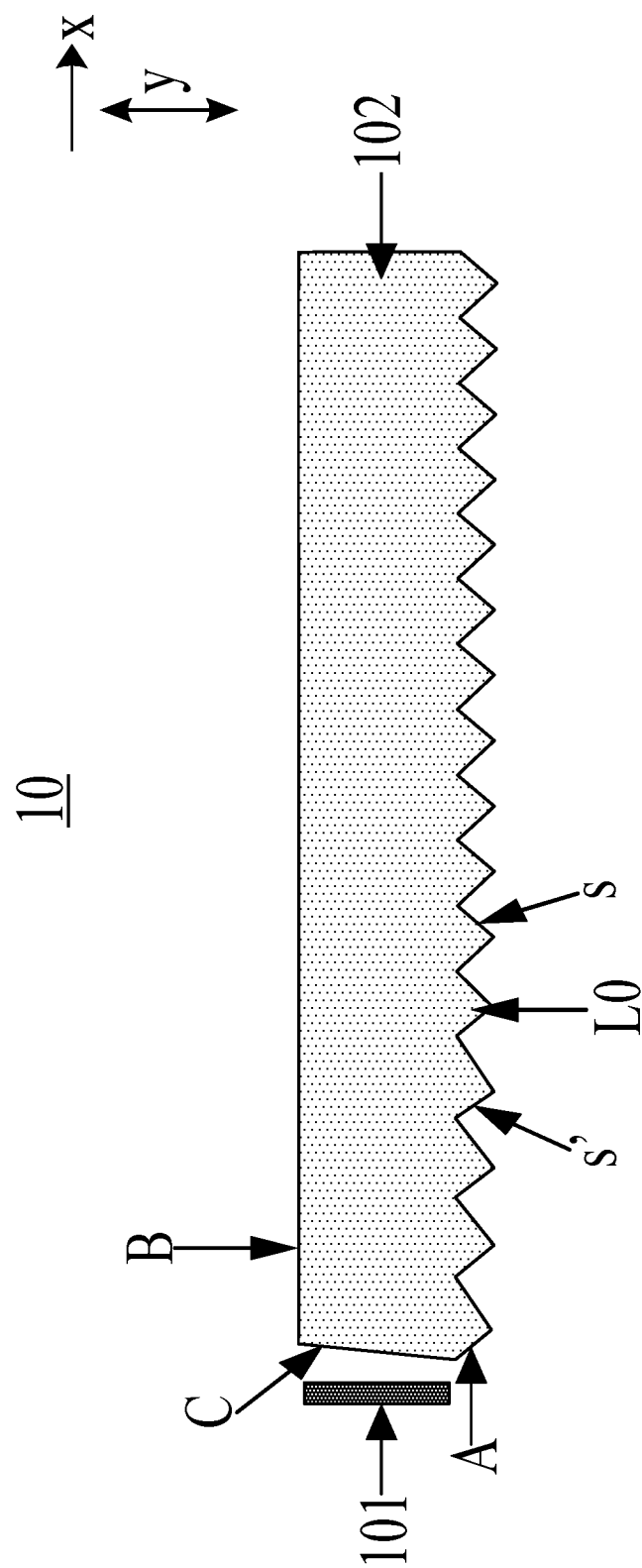
FIG. 1 is a schematic diagram of a structure of a light emitting module according to an embodiment of the present disclosure.

FIG. 1 is a schematic diagram of a structure of a light emitting module according to an embodiment of the present disclosure. As illustrated in FIG. 1, the light emitting module 10 may include a light emitting unit 101 and a light guide plate 102.

The light guide plate 102 may include a first plate surface A and a second plate surface B opposite to each other, and a plurality of side surfaces (for example, four side surfaces or six side surfaces) connecting the first plate surface A and the second plate surface B. The light emitting unit 101 is arranged closely to a target side surface C in the plurality of side surfaces, and the light emitting unit 101 is configured to emit light from the target side surface C to the light guide plate 102.

The first plate surface A has a plurality of target convex ridges L0 disposed in sequence along a direction x away from the light emitting unit 101. A length direction of each target convex ridge L0 is parallel to the side surface C. Each target convex ridge L0 is configured to totally reflect the light emitted from the target side surface C to the light guide plate 102 to the second plate surface B from a target ridge surface s, away from the light emitting unit 101, of each target convex ridge L0. In the direction x away from the light emitting unit 101, the target ridge surfaces s of the plurality of target convex ridges L0 are flat surfaces, and angles between the target ridge surfaces s and a thickness direction y of the light guide plate 101 tend to decrease.

Figure 2:
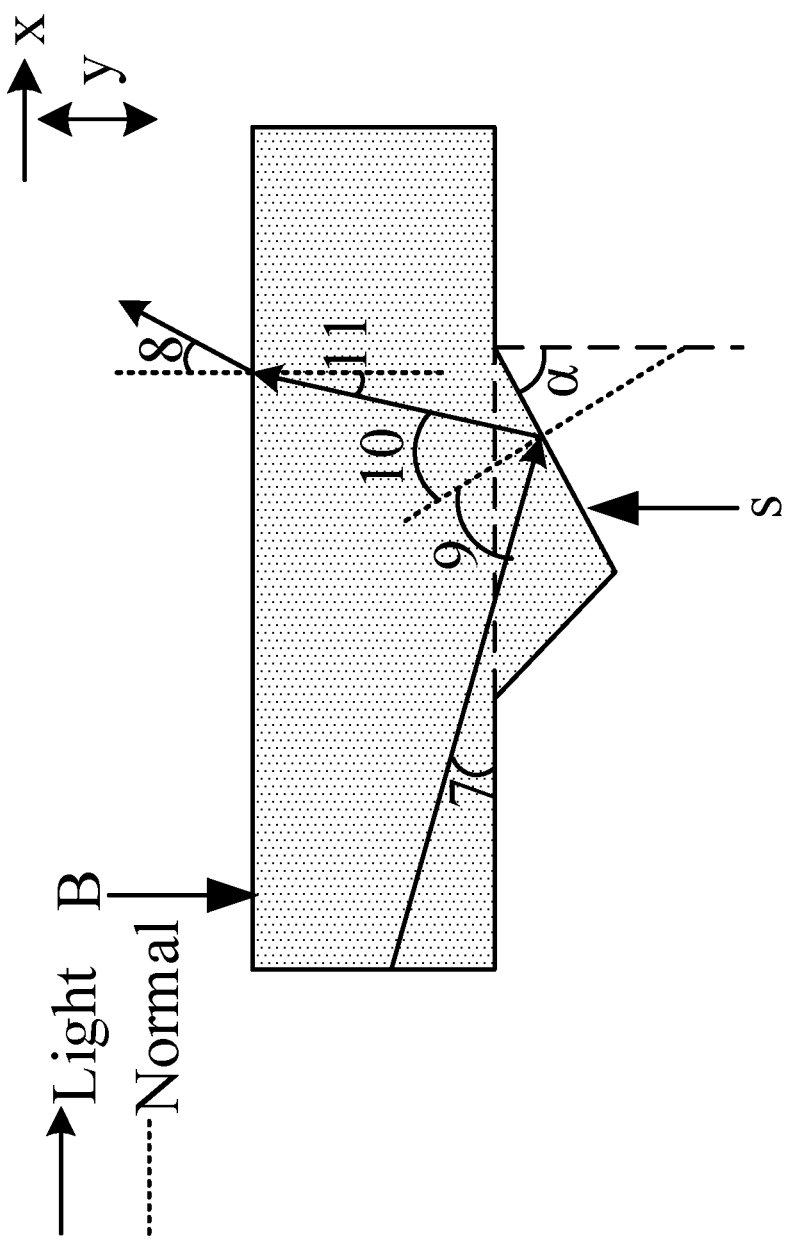
FIG. 2 is a schematic diagram of a partial structure of a light emitting module according to an embodiment of the present disclosure.
Figure 3:
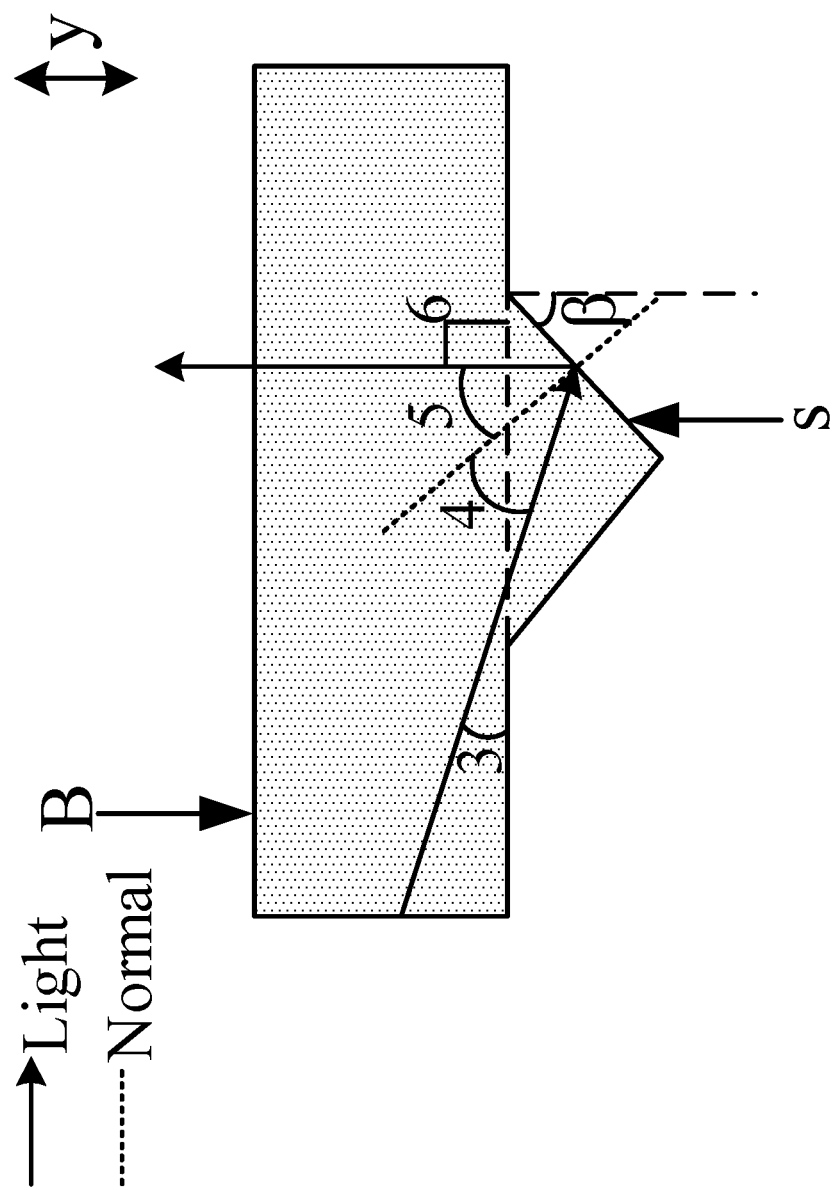
FIG. 3 is a schematic diagram of a partial structure of another light emitting module according to an embodiment of the present disclosure.

Exemplarily, FIG. 2 schematically illustrates a target convex ridge, close to the light emitting unit, in the light guide plate, and FIG. 3 schematically illustrates a target convex ridge, away from the light emitting unit, in the light guide plate. In FIG. 2, the angle between the target ridge surface s of the target convex ridge and the thickness direction y of the light guide plate is α. In FIG. 3, the angle between the target ridge surface s of the target convex ridge and the thickness direction y of the light guide plate is β. The angle α is greater than the angle β. It should be noted that the relationship of the sizes of the angles between the target ridge surfaces of the target convex ridges in FIG. 1, FIG. 2 and FIG. 3 and the thickness direction of the light guide plate is merely illustrative, instead of representing actual sizes of the angles of the target convex ridges. Please refer to FIG. 2 and FIG. 3, the light emitted from the light emitting unit may be totally reflected on the target ridge surface s of the target convex ridge, and thus may be emitted to the second plate surface B of the light guide plate and emitted out of the light guide plate form the second plate surface B.

In the related art, the first plate surface of the light guide plate in the light emitting module is a circular mesh point surface, that is, the first plate surface has a plurality of circular protrusions, and the light emitting module further includes a reflection layer attached on the first plate surface. The light emitted from the light emitting unit may be emitted into the light guide plate, and pass through the circular protrusion of the light guide plate to be emitted to the reflection layer. Afterwards, the light may be reflected by the reflection layer, and then pass through the light guide plate and be emitted out of the light guide plate. The light emitted out of the light guide plate is divergent, with no cut-off angle. The light emitting module with a privacy film has a cut-off angle. However, the cut-off angle is big, and reaches 60 degrees, and luminance loss exists. In the embodiments of the present disclosure, as the first plate surface of the light guide plate has the target convex ridge, the divergence angle of the light which is emitted out of the light guide plate after being totally reflected on the target ridge surface of the target convex ridge may be smaller, such that the light emitting module may emit relatively converged light. Further, in the direction away from the light emitting unit, the angles between the target ridge surfaces of the target convex ridges and the thickness direction of the light guide plate tend to decrease. Therefore, in the case where the light is totally reflected on the target ridge surface of the target convex ridge, and then is emitted out of the light guide plate, the orientation of the emitted light may be deflected gradually towards the side where the light emitting unit is along the direction away from the light emitting unit, such that the light emitted from the light emitting module may be more converged. Thus, the visual angle of the display apparatus where the light emitting module reduces, and the display apparatus where the light emitting module is may implement peep prevention display.

In summary, in the light emitting module according to the embodiment of the present disclosure, the angles between the target ridge surfaces of the plurality of target convex ridges on the first plate surface and the thickness direction of the light guide plate tend to decrease, and the light emitted from the light emitting unit into the light guide plate may be totally reflected on the target ridge surfaces of the target convex ridges, and then be emitted towards the second plate surface and be emitted out of the light guide plate from the second plate surface. The light emitting module can implement peep prevention display of the display apparatus, such that no privacy film needs to be arranged when the display apparatus where the light emitting module is implements the peep prevention display, which prevents the privacy film from consuming the light emitted from the light emitting module. Therefore, the light-emitting luminance of the display apparatus is high, and the display effect is better.

Optionally, the light emitting unit may be a light bar. The light bar may include a reflection layer and a plurality of light emitting diodes (LEDs) arranged in an array on the reflection layer. The light guide plate may be made of polymethyl methacrylate (PMMA) which is also referred to as organic glass. This material has an angle of total reflection of 42.15 degrees. A minimum angle of the angles between the target ridge surfaces of the plurality of target convex ridges and the thickness direction of the light guide plate may be 46.5 degrees. The light emitted from the light emitting unit into the light guide plate may be totally reflected on the target ridge surface of the target convex ridge with the minimum angle, and the direction of the totally reflected light may be parallel to the thickness direction of the light guide plate. It should be noted that the minimum angle in the embodiments of the present disclosure is only an example, and the minimum angle may also be of other degrees. For example, if the light guide plate is not made of PMMA, or the angle of total reflection of the light guide plate is not 42.15 degrees, the minimum angle may be not 46.5 degrees, and the minimum angle may be adaptively adjusted according to the angle of total reflection of the light guide plate.

Optionally, the light emitted from the light emitting unit into the light guide plate may be only emitted towards the target ridge surface of the target convex ridge, and hence be totally reflected to the second plate surface by the ridge surface. The shape of the target convex ridge may be as illustrated in any one of FIG. 1 to FIG. 3. That is, the target convex ridge may have two ridge surfaces. The two ridge surfaces include a target ridge surface s and the other ridge surface s' connected to the ridge surface s. The two ridge surfaces of the target convex ridge are both flat surfaces, and the angle between the ridge surface s', close to the light emitting unit, of the two ridge surfaces and the thickness direction y of the light guide plate may be in the range of 0~70 degrees. Optionally, the ridge surface s', close to the light emitting unit, of the two ridge surfaces may also be a curved surface bending towards the side where the light emitting unit is, or the ridge surface s' close to the light emitting unit, of the two ridge surfaces may also be an uneven surface, which is not limited in the embodiments of the present disclosure.

Figure 4:
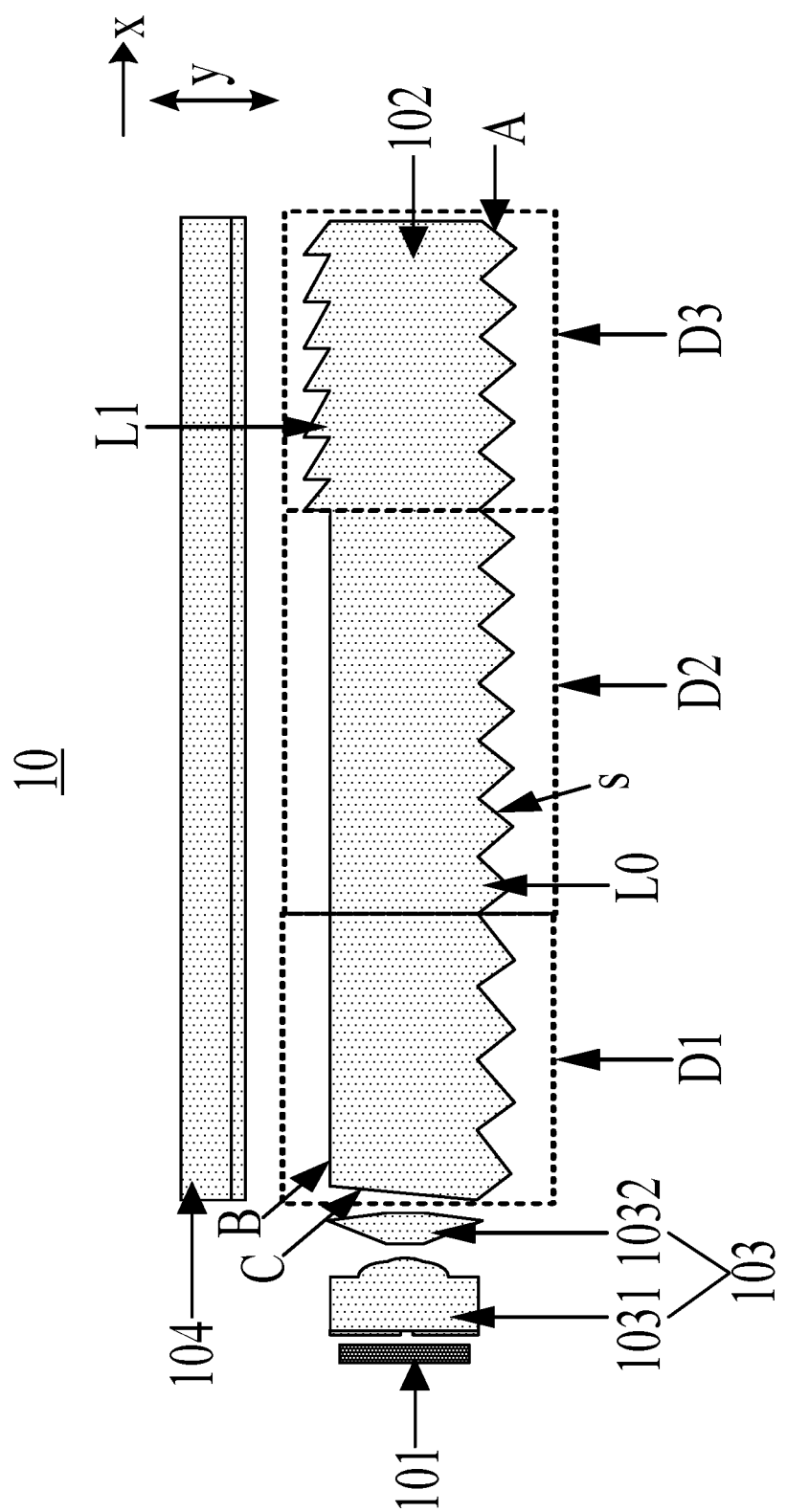
FIG. 4 is a schematic diagram of a structure of another light emitting module according to an embodiment of the present disclosure.

Optionally, FIG. 4 is a schematic diagram of structure of another light emitting module according to an embodiment of the present disclosure. As illustrated in FIG. 4, on the basis of FIG. 1, the second plate surface B may also have at least one first convex ridge L1 opposite to the target convex ridge L0 away from the light emitting unit 101. The first convex ridge L1 is in a region of the second plate surface B away from the light emitting unit 101. A length direction of the at least one first convex ridge L1 is parallel to the target side surface C. The first convex ridge L1 has two first ridge surfaces and a first ridge surface, close to the target side surface C, of the two first ridge surfaces is parallel to the thickness direction y of the light guide plate 102. Optionally, an angle between the first ridge surface, away from the target side surface C, of the two first ridge surfaces and the thickness direction y of the light guide plate may be 75 degrees, or the angle also may be of other degrees (for example, 70 degrees), which is not limited in the embodiments of the present disclosure.

Figure 5:
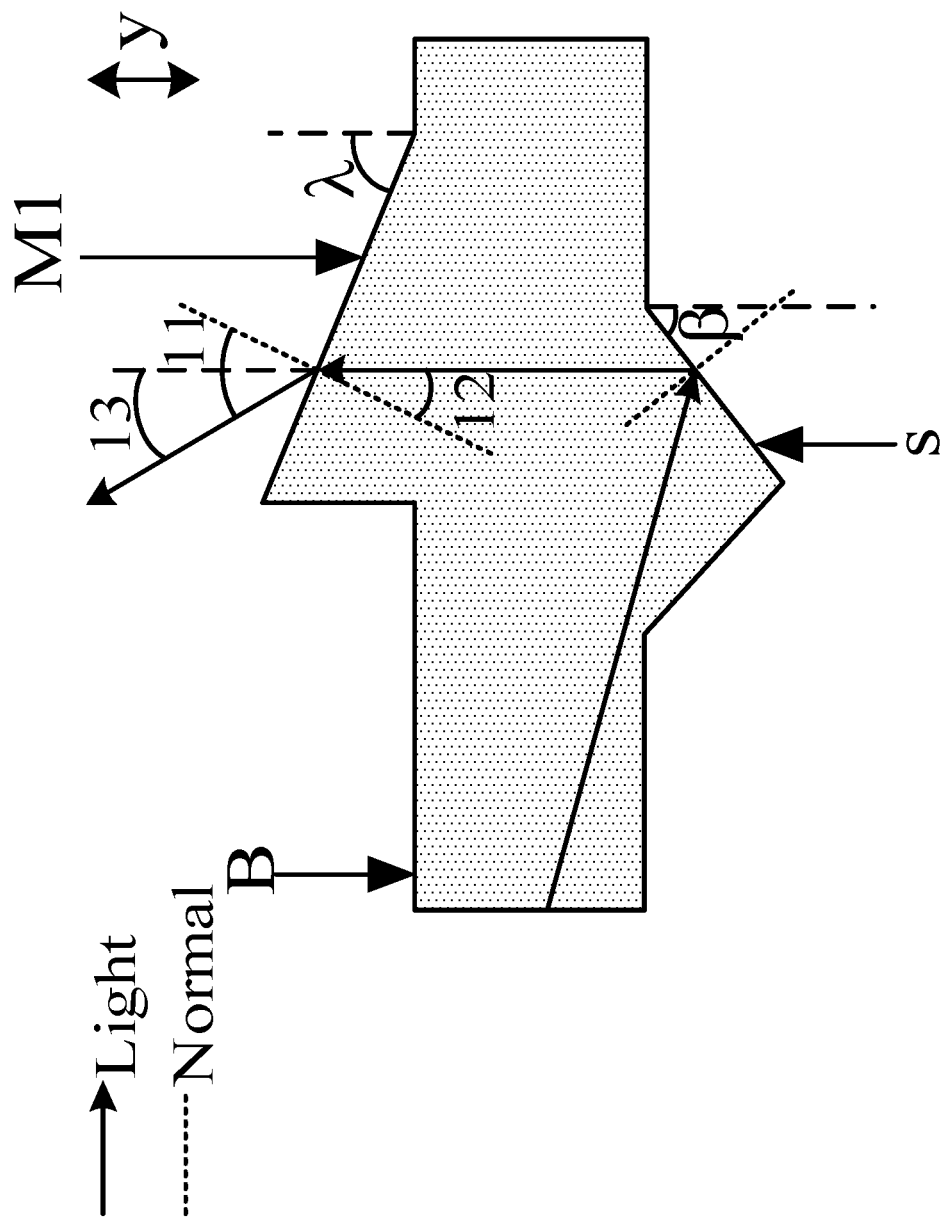
FIG. 5 is a schematic diagram of a partial structure of still another light emitting module according to an embodiment of the present disclosure.

Exemplarily, FIG. 5 schematically illustrates a first convex ridge in the light guide plate. Referring to FIG. 5, after the light emitted from the light emitting unit into the light guide plate is totally reflected on the target ridge surface s of the target convex ridge, the light may be emitted to a first ridge surface M1 of the first convex ridge away from the light emitting unit and be emitted out of the light guide plate from the first ridge surface M1, and converge towards a middle region of the light guide plate. Thus, the light emitted from the light emitting module is further converged, such that the visual angle of the display apparatus where the light emitting module becomes even smaller, and thus the display apparatus achieves a better peep prevention effect.

Still referring to FIG. 4, the light guide plate 102 may be divided into a first portion D1, a second portion D2 and a third portion D3 that are arranged in sequence along the direction x away from the light emitting unit 101 (the second portion and the third portion may be referred to as the remaining portion). Each of the first portion D1, the second portion D2 and the third portion D3 includes target convex ridges L0. The angle between the target ridge surface s of each target convex ridge L0 in the first portion D1 and the thickness direction y is a first angle, and the angle between the target ridge surface s of each target convex ridge L0 in the second portion D2 and the third portion D3 and the thickness direction y is a second angle. The first angle may be greater than the second angle. Optionally, the third portion D3 may include at least one first convex ridge L1. It should be noted that the relationship of the sizes of the angles between the target ridge surfaces of the target convex ridges in FIG. 4 and the thickness direction of the light guide plate is merely illustrative, instead of representing actual size of the angles of the target convex ridges. Exemplarily, the target convex ridge as illustrated in FIG. 2 may be a target convex ridge in the first portion D1, and the angle α in FIG. 2 is the first angle. The target convex ridge as illustrated in FIG. 3 may be a target convex ridge in the second portion D2 or the third portion D3, and the angle β in FIG. 3 is the second angle. The angle α is greater than the angle β.

Optionally, as a user generally faces rightly the middle region of the display apparatus when viewing images displayed on the display apparatus, the length of the first portion D1 may be made to be equal to the length of the third portion D3 in the direction away from the light emitting unit, such that the light emitted from the light emitting module has a small divergence angle. That is, the light is more converged to the middle region of the light emitting module, such that the images displayed on the display apparatus can only be viewed from a region rightly opposite to the middle region of the light emitting module. Thus, peep prevention display of the display apparatus may be achieved without affecting users' view of images displayed on the display apparatus.

It should be noted that the embodiment of the present disclosure is described only by taking an example where the first portion and the third portion have an equal length in the direction away from the light emitting unit. Optionally, the lengths of the first portion and the second portion in the direction away from the light emitting unit may also be determined according to preference of users when viewing images displayed on the display apparatus, to improve flexibility of the peep prevention display of the display apparatus. For example, if a user is used to viewing the images displayed on the display apparatus in a region close to the light emitting unit, the length of the third portion may be made to be greater than the length of the first portion, such that the light emitted from the light emitting module is converged towards the side where the light emitting unit is. If a user is used to viewing the images displayed on the display apparatus in a region away from the light emitting unit, the length of the first portion may be made to be greater than the length of the third portion, such that the light from by the light emitting module is converged towards a side opposite to the light emitting unit.

Optionally, still referring to FIG. 4, the light emitting module 10 may further include a lens assembly 103 between the light emitting unit 101 and the light guide plate 102. The light emitting unit 101 is configured to emit light to the lens assembly 103, and the lens assembly 103 is configured to adjust the light emitted from the light emitting unit 101 to parallel light perpendicular to the thickness direction of the light guide plate 102, and emit the parallel light to the light guide plate 102.

Exemplarily, the lens assembly 103 may include a lens film 1031 and a first prism film 1032 that are arranged in sequence along the direction x away from the light emitting unit 101. The light emitting unit 101 may emit light into the lens film 1031 of the lens assembly. The lens film 1031 may converge the light, and emit the converged light to the first prism film 1032. Subsequently, the first prism film 1032 may adjust the light emitted from the lens film 1031 to parallel light parallel to the light guide plate 102, and emit the parallel light to the light guide plate 102.

Figure 6:
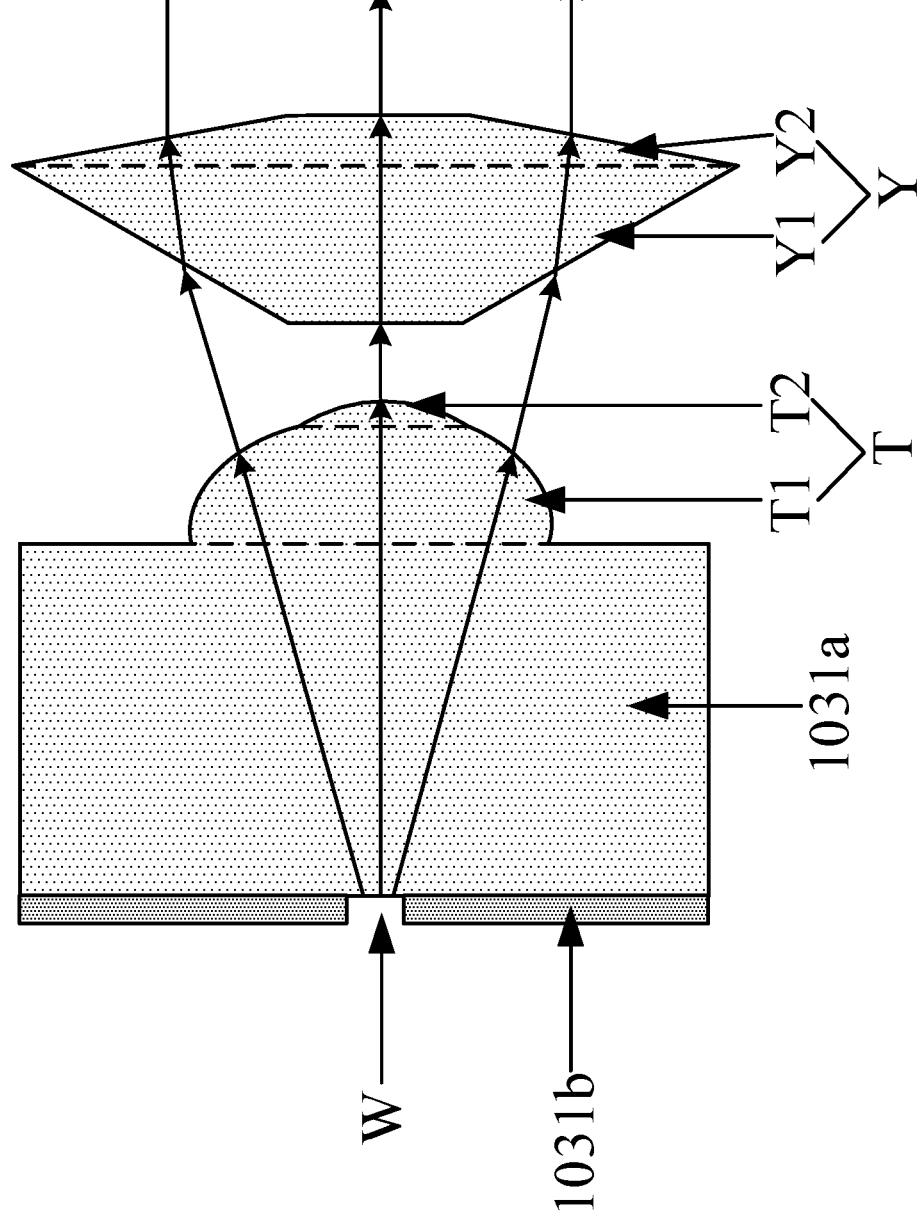
FIG. 6 is a schematic diagram of a structure of a lens assembly according to an embodiment of the present disclosure.

Optionally, as illustrated in FIG. 6, the lens film 1031 may include a lens film body 1031a, and a reflection layer 1031b attached on a side, close to the light emitting unit, of the lens film body 1031a. A light emitting surface on a side, away from the light emitting unit, of the lens film body 1031a has a protrusion structure T. The protrusion structure T may include a first convex lens T1 protruding from the light emitting surface, and a second convex lens T2 protruding from a central position of a surface of the first convex lens T1. The reflection layer 1031b has a hollow region W corresponding to the second convex lens T2, and the orthographic projection of the hollow region W on the lens film body 1031a falls within the region where the second convex lens T2 is. Optionally, the lens film body may be formed from a PMMA material by an injection molding process or a hot pressing process, and the reflection layer may be made of silver or aluminum. The reflection layer may be formed by an evaporation process. The hollow region W may be in a square shape, a circular shape or a rectangular shape, which is not limited in the embodiments of the present disclosure. The hollow region W may have an area in the range of 0.002~0.01 mm$^2$.

The first prism film 1032 may include a prism unit Y (as illustrated in FIG. 6) corresponding to the protrusion structure T in the lens film 1031. The prism unit may be formed of a forward truncated cone Y1 and a forward truncated cone Y2 that are arranged in sequence along the direction x away from the light emitting unit. The two forward truncated cones have of an equal area of upper base surfaces and share a lower base surface, and the heights of the two forward truncated cones decrease progressively along the direction x away from the light emitting unit. In the protrusion structure T and the corresponding prism unit Y, the orthographic projection of any of the two forward truncated cones on the lens film body 1031a falls within the region where the second convex lens T2 is.

It should be noted that if the light emitting unit is a light bar including a plurality of light emitting diodes, the lens film 1031 and the first prism film 1032 may be both in a bar shape. The lens film body 1031a may be in a bar shape, and a light emitting surface, away from the light emitting unit, of the bar-shaped lens film body 1031a may have a plurality of protrusion structures T. The plurality of protrusion structures T is in a one-to-one correspondence with the plurality of light emitting diodes in the light bar. The first prism film 1032 may also include a plurality of prism units Y in a one-to-one correspondence with the plurality of protrusion structures T. Optionally, the plurality of prism units may be connected to each other, such that the first prism film formed of the plurality of prism units may be in a bar shape. Light emitted from each light emitting diode may be changed through the corresponding protrusion structure and the prism unit to parallel light parallel to the light guide plate, and be emitted to the light guide plate.

Exemplarily, a portion of the light emitted from the light emitting diode to the lens film may be emitted to the reflection layer, and the remaining light may be emitted to the lens film body through the hollow region of the reflection layer. As the lens film body is made of PMMA, and PMMA has an angle of total reflection of 42.15 degrees, light with an incidence angle smaller than 42.15 degrees in the light which is directly emitted towards the lens film body may be directly emitted into the lens film body, and light with an incidence angle greater than 42.15 degrees may be totally reflected and emitted to the lens film body in an incidence angle smaller than 42.15 degrees after being reflected for multiple times between the light emitting diode and the reflection layer. The portion of light which is emitted towards the reflection layer may directly pass through the hollow region and be emitted into the lens film body in an incidence angle smaller than 42.15 degrees after being reflected for multiple times between the reflection layer and the light emitting unit. Subsequently, the light may be emitted out of the lens film from the protrusion structure corresponding to the light emitting diode, and then is emitted to the corresponding prism unit. Then, the light is refracted on two surfaces of the prism unit, and adjusted to parallel light parallel to the light guide plate and emitted to the light guide plate. It should be noted that as PMMA has a refractive index of 1.49, the refraction angle of the light is smaller than 42 degrees when it is emitted to the lens film body. Light with a refraction angle in the range of 0~14 degrees may be emitted from the second convex lens in the protrusion structure, and light with a refraction angle in the range of 14~42 degrees may be emitted from the first convex lens in the protrusion structure.

Figure 7:
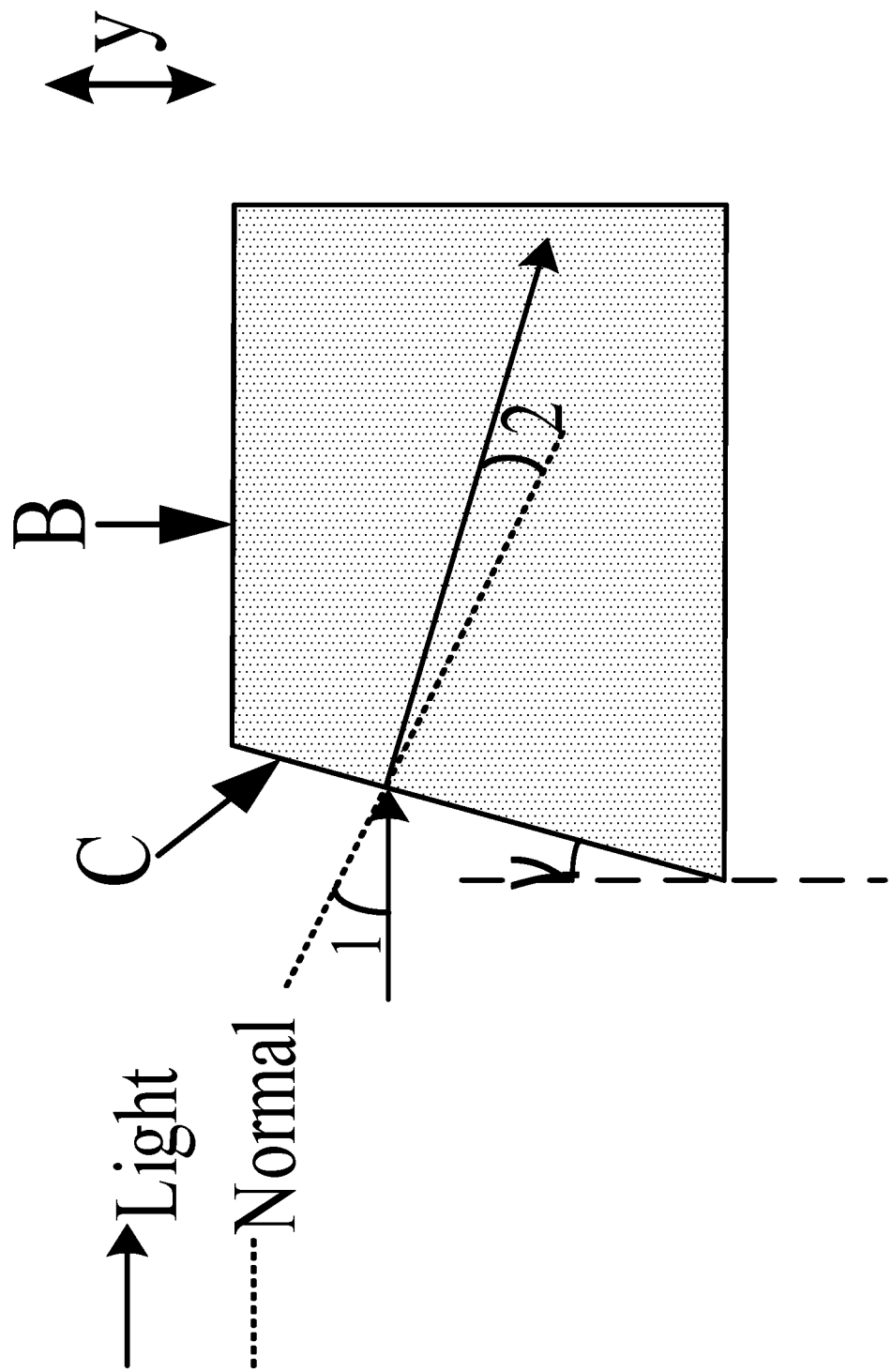
FIG. 7 is a schematic diagram of a partial structure of still another light emitting module according to an embodiment of the present disclosure.

Optionally, referring to FIG. 1, FIG. 4 and FIG. 7, the target side surface C of the light guide plate may be inclined towards the side where the second plate surface B is. Optionally, the target side surface C is a flat surface, and an angle γ between the target side surface C and the thickness direction y of the light guide plate may be in the range of 3.19~5.19 degrees. Referring to FIG. 2 and FIG. 7, or referring to FIG. 3 and FIG. 7, the parallel light emitted from the lens assembly 103 may be refracted at the inclined target side surface C, such that the refracted light may be emitted to the target ridge surface of the target convex ridge and totally reflected on the ridge surface. The incident light in FIG. 2 and FIG. 3 is the refracted light in FIG. 7.

The light emitting surface (that is, the second plate surface of the light guide plate) of the light emitting module is generally in a rectangular shape. If the divergence angle of the light on the side where each side of the rectangle is disposed is small, the visual angle of each side of the display apparatus where the light emitting module is disposed is smaller, and thus the peep prevention effect of the display apparatus is better. The foregoing light emitting module can narrow the visual angles at two opposite sides of the display apparatus. Optionally, a second prism film may also be arranged on the side where the second plate surface of the light guide plate is, such that the light emitted from the light emitting module is relatively converged in various directions. Thus, the visual angles at various sides of the display apparatus are small.

Figure 8:
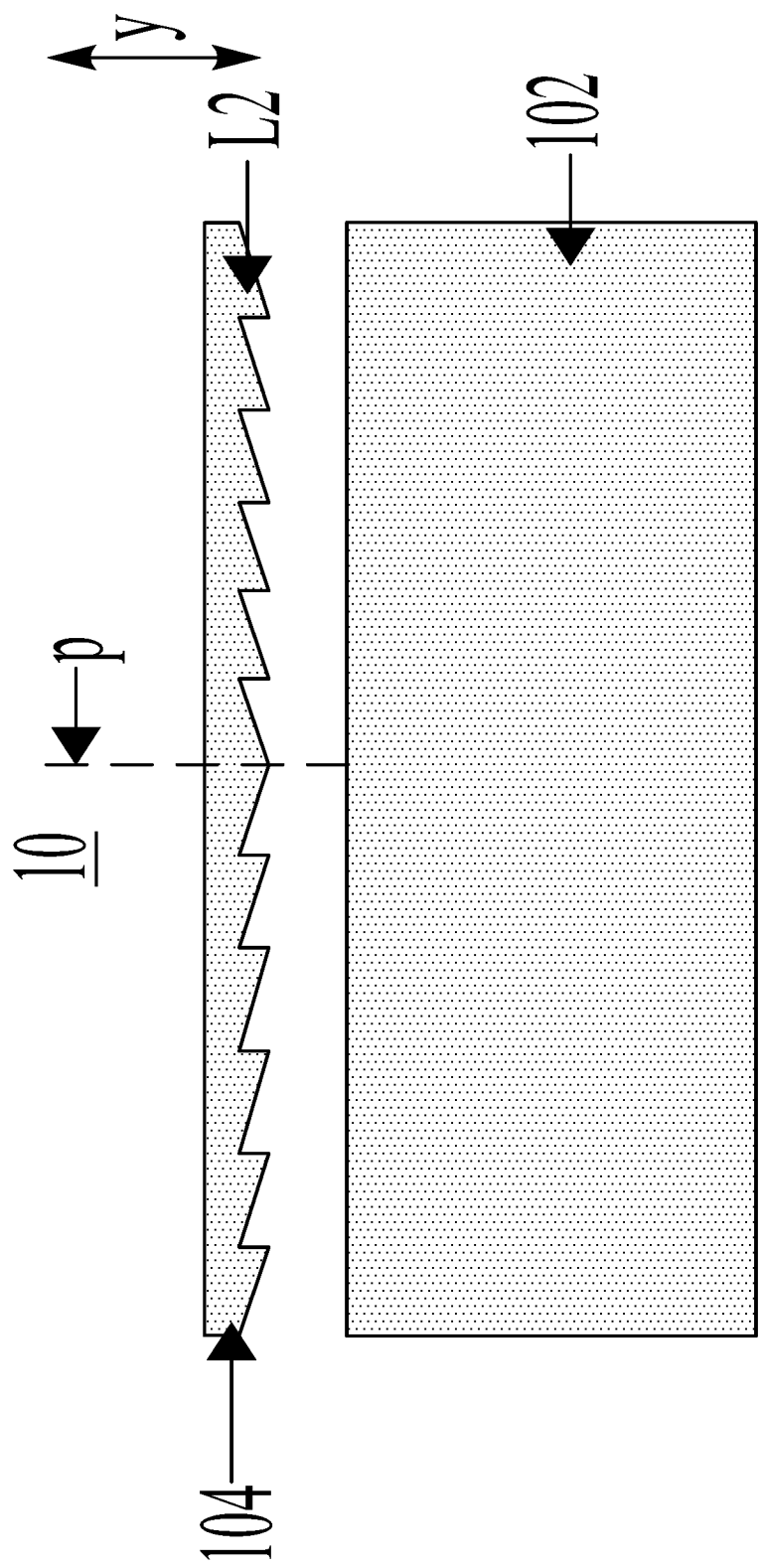
FIG. 8 is a schematic diagram of a structure of yet still another light emitting module according to an embodiment of the present disclosure.

Exemplarily, referring to FIG. 4 and FIG. 8, FIG. 4 is a front view of the light emitting module, and FIG. 8 is a right side view of the light emitting module. The light emitting module may further include a second prism film 104 on the side where the second plate surface of the light guide plate is. A surface of the second prism film 104 facing towards the surface of the light guide plate 102 has a plurality of second convex ridges L2. The length direction of the second convex ridge L2 is perpendicular to the length direction of the target convex ridge L0. The second convex ridge L2 has two second ridge surfaces that are both flat surfaces. The second ridge surface, close to the center of the second prism film 104, of the two ridge surfaces is parallel to the thickness direction y of the light guide plate. The second prism film 104 is symmetric relative to a reference plane p parallel to the thickness direction y and the length direction of the second convex ridge L2. The reference plane p further passes through the center of the second prism film 104. Optionally, still referring to FIG. 8, in the plurality of second convex ridges L2, two second convex ridges L2 closest to the center of the second prism film 104 are in contact with each other. Certainly, these two second convex ridges L2 may also not be in contact with each other.

Figure 9:
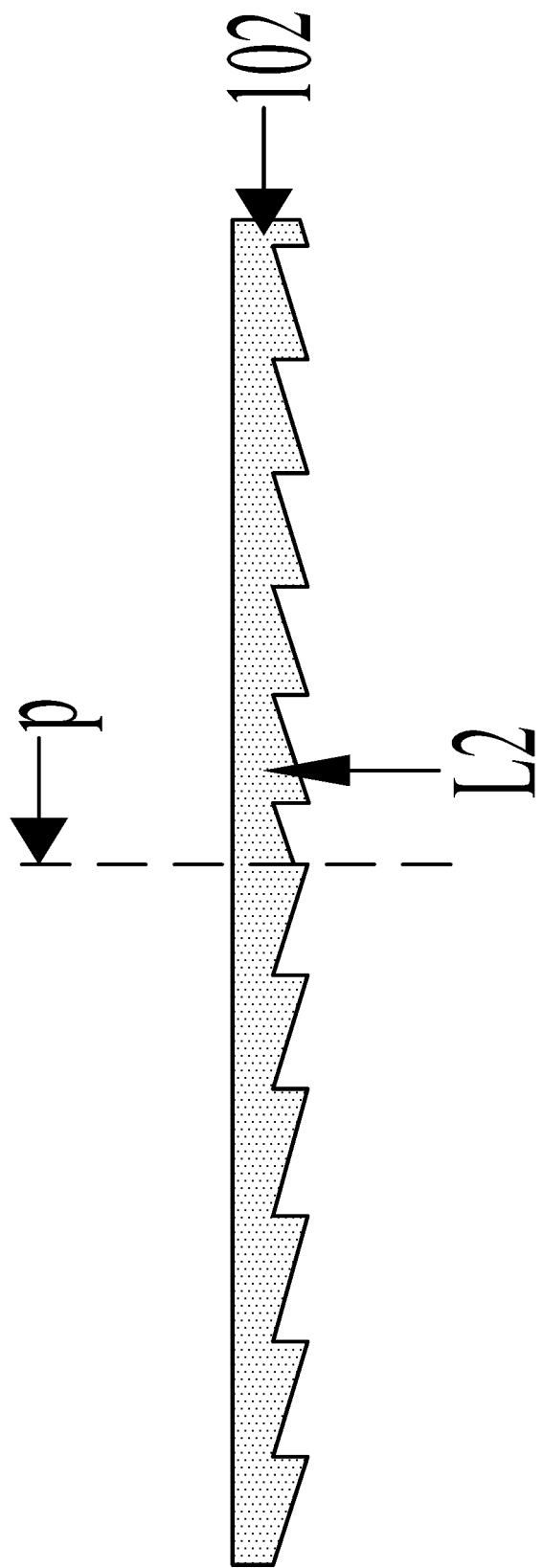
FIG. 9 is a schematic diagram of a structure of a second prism film according to an embodiment of the present disclosure.

It should be noted that the embodiments of the present disclosure are merely described by taking an example where the second prism film is symmetric relative to the reference plane p. Optionally, as illustrated in FIG. 9, the plurality of second convex ridges L2 on two sides of the reference plane p may also not be symmetric relative to the reference plane p, which is not limited in the embodiments of the present disclosure.

Optionally, the second ridge surface, away from the center of the second prism film, of the two ridge surfaces of the second convex ridge L2 is a flat surface, and in the plurality of second convex ridges L2 on the same side and at the center of the second prism film, the second ridge surfaces away from the center of the second prism film are parallel to each other. That is, surfaces of the plurality of second convex ridges L2 on one side of the reference plane p and away from the reference plane p are parallel to each other, and surfaces of the plurality of second convex ridges L2 on the other side of the reference plane p and away from the reference plane p are also parallel to each other. Exemplarily, an angle between the second ridge surface, away from the center of the second prism film, of two second ridge surfaces of each second convex ridge and the thickness direction of the light guide plate may be 80 degrees, or the angle may be of other degrees (for example, 70 degrees), which is not limited in the embodiments of the present disclosure. The second prism film may be formed from a polyethylene terephthalate (PET) material by a hot pressing process. The second prism film may be an integrally formed structure (the structure as illustrated in FIG. 8), or the second prism film may also be formed by attaching a plurality prisms on a PET substrate, and the plurality of prisms and the PET substrate are attached to each other to form the plurality of second convex ridges.

Figure 10:
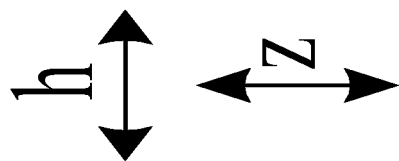
FIG. 10 a simulation diagram of an orientation effect of light emitted from a light emitting module according to an embodiment of the present disclosure.
Figure 10:
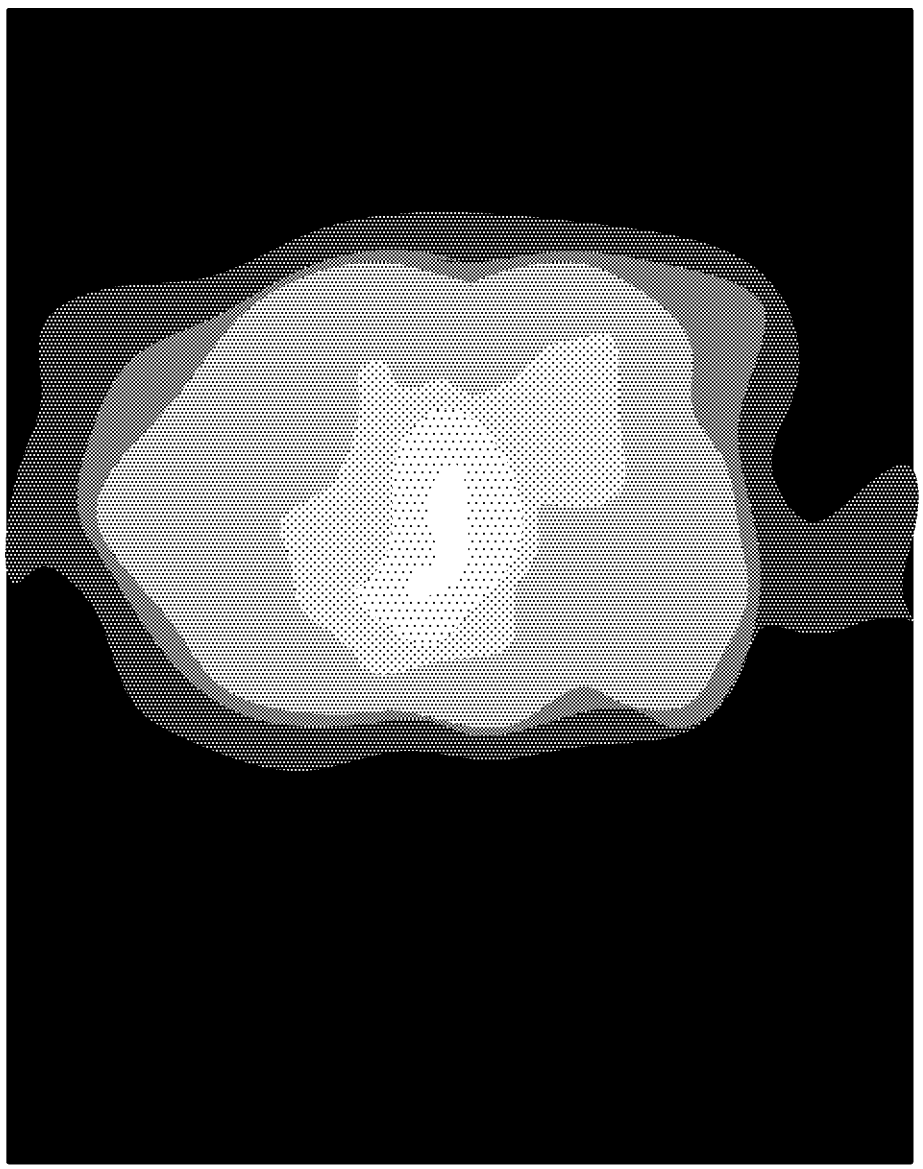
Figure 11:
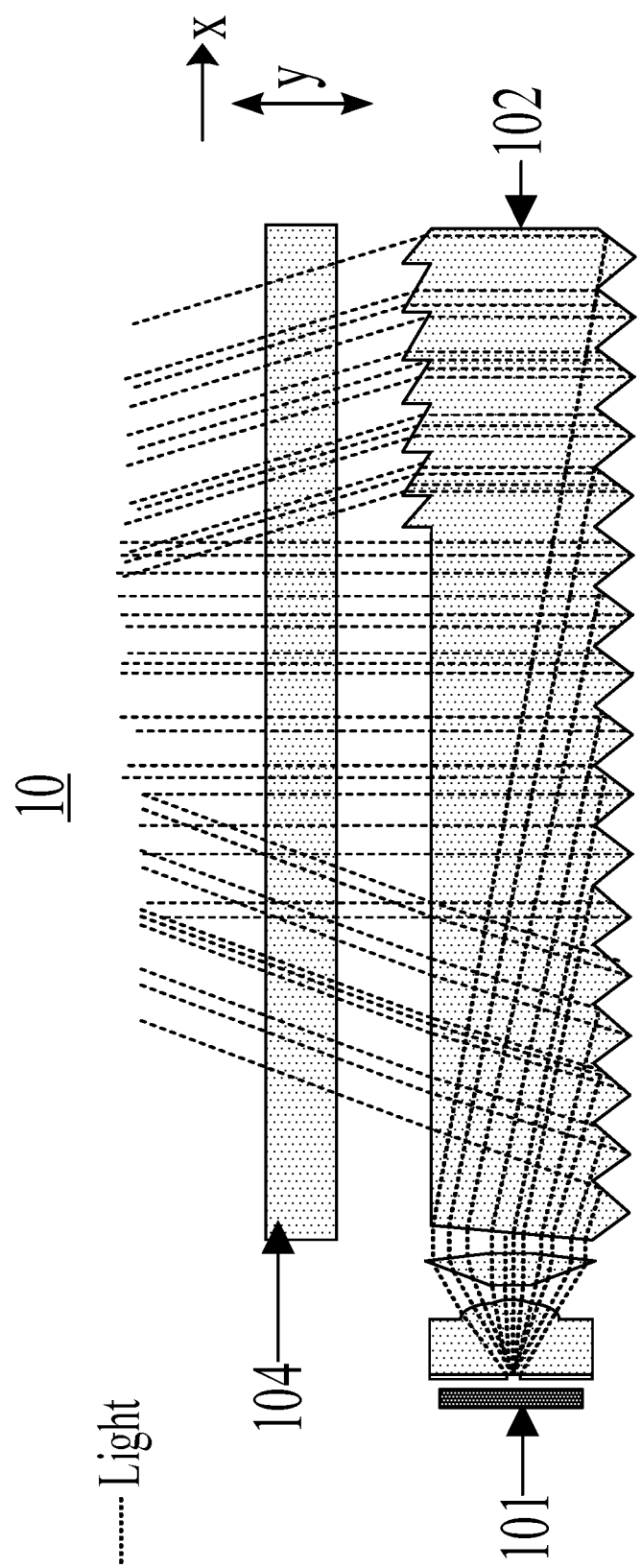
FIG. 11 is a diagram illustrating distribution of light emitted from a light emitting module according to an embodiment of the present disclosure.

FIG. 10 is a simulation diagram of an orientation effect of light emitted from the light emitting module as illustrated in FIG. 4 and FIG. 8, and FIG. 11 is a diagram showing distribution of light emitted from the light emitting module as illustrated in FIG. 4 and FIG. 8. Referring to FIG. 10 and FIG. 11, the extending directions of the light emitting module may include an h direction and a z direction that are perpendicular to each other. The h direction may be parallel to the direction x away from the light emitting unit in FIG. 11, and the z direction may be perpendicular to the thickness direction of the light guide plate (that is, the y direction). In addition, in FIG. 10, a region with lighter color indicates that more light is emitted towards this region. As known from FIG. 10 and FIG. 11, the light emitted from the light emitting unit may be more converged to a middle region of the light emitting module 10 after passing through the light guide plate 102 and the second prism film 104, that is, region orientation may be achieved.

In the related art, a cut-off luminance angle of the light emitting module is generally greater than 60 degrees, such that the display apparatus where the light emitting module is disposed has a greater visual angle, but has a poor peep prevention effect. It should be noted that the cut-off luminance angle of the light emitting module is the divergence angle of the light emitted from the light emitting module. Referring to FIG. 12, the cut-off luminance angle θ of the light emitting module 10 according to the embodiments of the present disclosure may be less than 20 degrees, and a half-luminance angle thereof may be less than 10, such that the visual angle of the display apparatus may be less than 20 degrees, which improves the peep prevention effect of the display apparatus. It should be noted that the half-luminance angle is used to indicate a region having a high luminance formed by the light emitted from the light emitting module. If a user is in a region to which the light in the range of the half-luminance is emitted, the images displayed on the display apparatus viewed by the user have a better display effect. If the user is outside the region to which the light in the range of the half-luminance is emitted, the user can only view poorly displayed images or may fail to view the images displayed on the display apparatus.

In summary, in the light emitting module according to the embodiments of the present disclosure, the angles between the target ridge surfaces of the plurality of target convex ridges on the first plate surface and the thickness direction of the light guide plate tend to decrease. The light emitted from the light emitting unit to the light guide plate may be totally reflected on the target ridge surfaces of the target convex ridges, and then is emitted towards the second plate surface and is emitted out of the light guide plate from the second plate surface. The light emitting module can implement peep prevention display of the display apparatus, such that the display apparatus where the light emitting module is can implement the peep prevention display without a privacy film. This prevents the privacy film from consuming the light emitted from the light emitting module. Therefore, the light-emitting luminance of the display apparatus is high, and the display effect is better.

Hereinafter, by taking an example where the light guide plate is made from a PMMA material, derivation of the sizes of the angles in the light guide plate is elaborated.

Referring to FIG. 3 and FIG. 7, it is assumed that the target convex ridge in FIG. 3 is a target convex ridge in the second portion, and the refracted light in FIG. 7 is incident light in FIG. 3. As the incident light is parallel to the light guide plate, an incidence angle ∠1 in FIG. 7 is equal to an inclination angle γ of the target side surface C (that is, ∠1=∠γ), and ∠3=∠1−∠2 in FIG. 3. As light in FIG. 3 is totally reflected, and PMMA has an angle of total reflection of 42.15 degrees, an incidence angle ∠4 in FIG. 3 is equal to an emergence angle ∠5, and needs to be greater than 42.15 degrees, that is, ∠4=∠5>42.15 degrees. The second portion is a middle portion of the light guide plate, light emitted from this portion is perpendicular to the light guide plate, and thus an angle ∠6 is a right angle, and hence it is known that ∠3+∠4+∠5=90 degrees, that is, ∠3+2∠5=90 degrees, and ∠5+∠β=90 degrees. It is known by transformations based on the relationships among the above angles that 2∠β−∠γ+∠2=90 degrees. As PMMA has a refractive index of 1.49, the incidence angle ∠1 and the refraction angle ∠2 satisfy: sin ∠1=1.49×sin ∠2=sin γ. By simultaneous equations of 1.49×sin ∠2=sin γ and ∠γ−∠2+2∠β=90 degrees, the relationship between ∠γ and ∠β can be obtained.

Therefore, the inclination angle γ of the target side surface C of the light guide plate may be firstly determined, and then the second angle β of the target convex ridges in the second portion and the third portion of the light guide plate may be determined based on the angle ∠γ. Alternatively, the second angle β of the target convex ridges in the second portion and the third portion of the light guide plate may be firstly determined, and then the inclination angle γ of the target side surface C of the light guide plate may be determined based on the angle ∠β. In addition, the determined second angle β and inclination angle γ needs to enable that light parallel to the light guide plate is totally reflected on the target ridge surface of the target convex ridge after being emitted into the target side surface, and light emitted from the light emitting unit into the light guide plate can be emitted towards the target ridge surface of the target convex ridge away from the light emitting unit. Exemplarily, the inclination angle γ of the target side surface may be in the range of: 3.19 degrees≤∠γ≤5.19 degrees, and the second angle β of the target convex ridges in the second portion and the third portion of the light guide plate may be 46.5 degrees.

After the second angle β of the target convex ridges in the second portion and the third portion of the light guide plate is determined, the size of the angle between the target ridge surface of the target convex ridge in the first portion of the light guide plate and the thickness direction of the light guide plate may be directly determined (that is, the first angle α in FIG. 2). The angle ∠α is less than the angle ∠β. If the light needs to be more converged to the opposite side of the light emitting unit, the angle ∠α may be made to be smaller, and if the light needs to be more converged to the side where the light emitting unit is, the angle ∠α may be made to be greater. Exemplarily, the target convex ridges may be differently designed, such that the light emitted from the light emitting module has different orientation regions, and thereby the display apparatus where the light emitting module is disposed has a high flexibility in peep prevention display.

Referring to FIG. 2, FIG. 3 and FIG. 7, it is assumed that the target convex ridge in FIG. 2 is a target convex ridge in the first portion of the light guide plate, and the refracted light in FIG. 7 is incident light in FIG. 2. As the light which is emitted towards the light guide plate is parallel to the light guide plate, the light which is emitted towards the target ridge surface of the target convex ridge is also parallel, and an angle ∠7 in FIG. 2 is equal to the angle ∠3 in FIG. 3 (that is, ∠7=∠3). With reference to the description of the inclination angle and the second angle, it can be obtained by transformation that 1.49×sin(∠γ−∠7)=sin γ. As light in FIG. 2 is totally reflected, an incidence angle ∠9 is equal to an emergence angle ∠10 (that is, ∠9=∠10). In addition, it can be obtained from FIG. 2 that ∠α=∠7+∠9, ∠10=∠11+(90 degrees−∠α). Based on the relationship among the angles, it can be obtained by transformation that $2\angle\alpha-\angle 7-\angle 11=90$ degrees. When passing through the second plate surface B and being emitted out of the light guide plate, light may be refracted on the second plate surface B, and thus may be emitted out of the second plate surface towards the direction x away from the light emitting unit. As PMMA has a refractive index of 1.49, an incidence angle $\angle 11$ and a refraction angle $\angle 8$ satisfy: $\sin\angle 8=1.49\times\sin\angle 11$. By simultaneous equations of $\sin\angle 8=1.49\times\sin\angle 11$, $2\angle\alpha-\angle 7-\angle 11=90$ degrees and $1.49\times\sin(\angle\gamma-\angle 7)=\sin\gamma$, relationships among the emergence angle $\angle 8$, $\angle\alpha$ and $\angle\gamma$ of the light may be obtained. In this way, after $\angle\gamma$ is determined, the first angle $\alpha$ between the target ridge surface of the target convex ridge in the first portion of the light guide plate and the thickness direction of the light guide plate may be determined based on the emergence angle $\angle 8$ of the light desired.

Referring to FIG. 5, the light emitted to the first convex ridge in FIG. 5 may be parallel to the thickness direction y of the light guide plate, $\angle 11$ is an emergence angle of the light on the surface of the first convex ridge away from the light emitting unit, $\angle 12$ is an incidence angle of the light, $\angle 13$ may indicate the orientation of the light, and $\angle\lambda$ is an angle between the surface of the first convex ridge away from the target side surface and the thickness direction of the light guide plate. It can be known from FIG. 5 that $\angle 12+\angle\lambda=90$ degrees, $\angle 11=\angle 12+\angle 13$ and $\sin\angle 11=1.49\times\sin\angle 2$. Therefore, it can be obtained that $\sin(90\text{ degrees}-\angle\lambda+\angle 13)=1.49\times\sin(90\text{ degrees}-\angle\lambda)$. Therefore, $\angle\lambda$ may be determined based on $\angle 13$. That is, the angle between the surface of the first convex ridge away from the light emitting unit and the thickness direction of the light guide plate may be determined based on the orientation of the desired light.

An embodiment of the present disclosure further provides a display apparatus. The display apparatus may include the light emitting module as described above. Optionally, the light emitting module may be used as a backlight module in the display apparatus to provide backlight for the display panel in the display apparatus.

During specific implementation, the display apparatus provided in the embodiments of the present disclosure may be any product or part with a display function, such as a mobile phone, a tablet computer, a television, a display, a laptop computer, a digital photo frame, a navigator, a near to eye display apparatus or the like.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A light emitting module, comprising: a light emitting unit and a light guide plate; wherein
   the light guide plate comprises a first plate surface and a second plate surface opposite to each other, and a plurality of side surfaces connecting the first plate surface and the second plate surface; and the light emitting unit is close to a target side surface of the plurality of side surfaces, and is configured to emit light from the target side surface to the light guide plate;
   the first plate surface has a plurality of target convex ridges disposed in sequence along a direction away from the light emitting unit, and a length direction of the target convex ridge is parallel to the target side surface; each of the target convex ridges is configured to totally reflect light emitted from the target side surface to the light guide plate to the second plate surface from a target ridge surface, away from the light emitting unit, of each target convex ridge;
   wherein, in the direction away from the light emitting unit, target ridge surfaces of the plurality of target convex ridges are flat surfaces, and angles between the target ridge surfaces and a thickness direction of the light guide plate tend to decrease.

2. The light emitting module according to claim 1, wherein the light guide plate comprises:
   a first portion and a remaining portion disposed in sequence along the direction away from the light emitting unit;
   the first portion and the remaining portion comprise the target convex ridges, an angle between a target ridge surface of each target convex ridge in the first portion and the thickness direction is a first angle, and an angle between a target ridge surface of each target convex ridge in the remaining portion is a second angle, and the first angle is greater than the second angle.

3. The light emitting module according to claim 1, wherein a minimum angle of the angles between the target ridge surfaces of the plurality of target convex ridges and the thickness direction is 46.5 degrees.

4. The light emitting module according to claim 1, wherein the target convex ridge has two ridge surfaces, and the two ridge surfaces of the target convex ridge are both flat surfaces.

5. The light emitting module according to claim 4, wherein an angle between a ridge surface, close to the light emitting unit, of the two ridge surfaces of the target convex ridge and the thickness direction is in a range of 0~75 degrees.

6. The light emitting module according to claim 1, wherein the target side surface is inclined towards a side where the second plate surface is.

7. The light emitting module according to claim 6, wherein the target side surface is a flat surface, and an angle between the target side surface and the thickness direction is in a range of 3.19~5.19 degrees.

8. The light emitting module according to claim 1, wherein the second plate surface has at least one first convex ridge, and the first convex ridge is in a region of the second plate surface away from the light emitting unit;
   a length direction of the first convex ridge is parallel to the target side surface, the first convex ridge has two first ridge surfaces which are both flat surfaces, and a first ridge surface, close to the light emitting unit, of the two first ridge surfaces is parallel to the thickness direction.

9. The light emitting module according to claim 8, wherein an angle between a first ridge surface, away from the light emitting unit, of the two first ridge surfaces and the thickness direction is 75 degrees.

10. The light emitting module according to claim 8, wherein the light guide plate comprises: a first portion, a second portion and a third portion disposed in sequence along the direction away from the light emitting unit;
    wherein the first portion, the second portion and the third portion all comprise the target convex ridges, an angle between a target ridge surface of each target convex ridge in the first portion and the thickness direction is a first angle, an angle between a target ridge surface of each target convex ridge in the second portion and the third portion and the thickness direction is a second angle, and the first angle is greater than the second angle; and
    the third portion comprises the at least one first convex ridge.

11. The light emitting module according to claim 10, wherein the first portion and the third portion have an equal length along the direction away from the light emitting unit.

12. The light emitting module according to claim 1, further comprising: a lens assembly between the light emitting unit and the light guide plate; wherein
the light emitting unit is configured to emit light to the lens assembly, and the lens assembly is configured to adjust light emitted from the light emitting unit to parallel light perpendicular to the thickness direction and emit the parallel light to the light guide plate.

13. The light emitting module according to claim 12, wherein the lens assembly comprises:
a lens film and a first prism film disposed in sequence along the direction away from the light emitting unit; wherein
the lens film is configured to converge the light emitted from the light emitting unit, and emit converged light to the first prism film; and
the first prism film is configured to adjust light emitted from the lens film to the parallel light, and emit the parallel light to the light guide plate.

14. The light emitting module according to claim 13, wherein the lens film comprises: a lens film body, and a reflection layer attached on a side of the lens film body close to the light emitting unit, a protrusion structure is on a light emitting surface on a side, away from the light emitting unit, of the lens film body, wherein the protrusion structure comprises: a first convex lens protruding from the light emitting surface, and a second convex lens protruding from a central position of a surface of the first convex lens, the reflection layer comprises a hollow region corresponding to the second convex lens, and an orthographic projection of the hollow region on the lens film body is within a region where the second convex lens is; and
the first prism film comprises: a prism unit corresponding to the protrusion structure, wherein the lens unit comprises two forward truncated cones disposed in sequence along the direction away from the light emitting unit, the two forward truncated cones have an equal area of upper base surfaces and share a lower base surface, and heights of the two forward truncated cones decrease progressively along the direction away from the light emitting unit; in the protrusion structure and the prism unit corresponding to the protrusion structure, an orthographic projection of any of the two forward truncated cones on the lens film body is within the region where the second convex lens is.

15. The light emitting module according to claim 1, further comprising: a second prism film on a side where the second plate surface of the light guide plate is; wherein
a plurality of second convex ridges are on a surface, facing towards the light guide plate, of the second prism film, a length direction of the second convex ridge is perpendicular to the length direction of the target convex ridge, the second convex ridge has two second ridge surfaces, and a second ridge surface, close to a center of the second prism film, of the two second ridge surfaces is a flat surface and is parallel to the thickness direction.

16. The light emitting module according to claim 15, wherein in the plurality of second convex ridges, two second convex ridges closest to the center of the second prism film are in contact with each other.

17. The light emitting module according to claim 15, wherein the second prism film is symmetric relative to a reference plane, the reference plane is parallel to the thickness direction and a length direction of the second convex ridge and passes through the center of the second prism film.

18. The light emitting module according to claim 15, wherein a second ridge surface, away from the center of the second prism film, of the two second ridge surfaces is a flat surface; and in a plurality of second convex ridges in the center and on the same side of the second prism film, second ridge surfaces away from the center of the second prism film are parallel to each other.

19. A display apparatus, comprising: the light emitting module according to claim 1.

* * * * *